US011399513B1

(12) United States Patent
Dana

(10) Patent No.: US 11,399,513 B1
(45) Date of Patent: Aug. 2, 2022

(54) SYSTEMS AND METHODS FOR PET-BASED NETWORKING

(71) Applicant: Sean Patrick Dana, Fort Lauderdale, FL (US)

(72) Inventor: Sean Patrick Dana, Fort Lauderdale, FL (US)

( * ) Notice: Subject to any disclaimer, the term of this patent is extended or adjusted under 35 U.S.C. 154(b) by 0 days.

(21) Appl. No.: 17/554,302

(22) Filed: Dec. 17, 2021

(51) Int. Cl.
*A01K 27/00* (2006.01)
*A01K 11/00* (2006.01)
*G06N 20/00* (2019.01)
*H04W 4/021* (2018.01)
*H04W 4/02* (2018.01)
*H04W 4/90* (2018.01)
*A01K 29/00* (2006.01)

(52) U.S. Cl.
CPC .......... *A01K 27/009* (2013.01); *A01K 11/008* (2013.01); *A01K 27/006* (2013.01); *A01K 29/005* (2013.01); *G06N 20/00* (2019.01); *H04W 4/021* (2013.01); *H04W 4/023* (2013.01); *H04W 4/90* (2018.02)

(58) Field of Classification Search
CPC .. A01K 27/009; A01K 11/008; A01K 27/006; A01K 29/005; G06N 20/00; H04W 4/021; H04W 4/023; H04W 4/90
USPC ...................................................... 340/573.3
See application file for complete search history.

(56) References Cited

U.S. PATENT DOCUMENTS

| | | | |
|---|---|---|---|
| 5,868,100 A | 2/1999 | Marsh | |
| 6,581,546 B1 | 6/2003 | Dalland | |
| 7,034,695 B2 | 4/2006 | Troxler | |
| 7,328,671 B2 | 2/2008 | Kates | |
| 7,424,867 B2 | 9/2008 | Kates | |
| 7,760,137 B2 | 7/2010 | Martucci | |
| 7,786,876 B2 | 8/2010 | Troxler | |

(Continued)

FOREIGN PATENT DOCUMENTS

KR 20160086029 7/2016

OTHER PUBLICATIONS

Fetchadate, "FetchaDate—Where Pet Lovers Meet!", https://fetchadate.com/#firstSection, downloaded on Dec. 17, 2021, pp. 1-5.

(Continued)

*Primary Examiner* — Omar Casillashernandez
(74) *Attorney, Agent, or Firm* — The Concept Law Group, PA; Scott D. Smiley; Scott M. Garrett

(57) ABSTRACT

A pet-related system with a first dog collar operably configured to determine if the first dog collar is at or outside of a first user-selected geofence boundary; and a mobile electronic device communicatively coupled to the first dog collar. The mobile electronic device is operably configured to display a user interface of a first instance of a pet-related social network application associated with a first social network identity; receive a user input selecting the first user-selected geofence boundary of the first dog collar; communicate the first user-selected geofence boundary to the first dog collar; and receive a proximity notification of the mobile electronic device's proximity to a second mobile electronic device communicatively coupled to a second dog collar and operably configured to execute instructions of a second instance of the pet-related social network application associated with a second social network identity.

16 Claims, 8 Drawing Sheets

(56) References Cited

U.S. PATENT DOCUMENTS

| | | |
|---|---|---|
| 7,848,765 B2 | 12/2010 | Phillips |
| 8,312,845 B2 | 11/2012 | Giunta |
| 8,633,981 B2 | 1/2014 | Russoniello et al. |
| 8,656,865 B1 | 2/2014 | Foote |
| 8,839,744 B1 | 9/2014 | Bianchi |
| 8,922,363 B2 | 12/2014 | So |
| 9,101,112 B2 | 8/2015 | Giunta |
| 9,693,536 B1* | 7/2017 | Dana .................. A01K 27/001 |
| 9,972,056 B2 | 5/2018 | Wilkins et al. |
| 2012/0000431 A1 | 1/2012 | Khoshkish |
| 2012/0023169 A1 | 1/2012 | Kang et al. |
| 2012/0204811 A1 | 8/2012 | Ryan |
| 2013/0157628 A1 | 6/2013 | Kim et al. |
| 2014/0266732 A1 | 9/2014 | Barbeau et al. |
| 2014/0274225 A1* | 9/2014 | Lacatus ............ H04W 52/0261 |
| | | 455/574 |
| 2016/0166156 A1 | 6/2016 | Yuen et al. |
| 2020/0349560 A1 | 11/2020 | Samples et al. |
| 2021/0045353 A1* | 2/2021 | Ehrman ............... A01K 27/001 |
| 2021/0153479 A1* | 5/2021 | Mindel ................. G06T 7/0012 |
| 2021/0409906 A1* | 12/2021 | Ickovic ................. G06V 40/10 |

OTHER PUBLICATIONS

Shi, Shuyun et al., "Applications of blockchain in ensuring the security and privacy of electronic health record systems: A survey", Computers & Security, Jul. 2020, pp. 1-20.

* cited by examiner

100 # SYSTEMS AND METHODS FOR PET-BASED NETWORKING

FIELD OF THE INVENTION

The present invention relates generally to pet accessories, and, more particularly, relates to a pet accessory including mechanisms for facilitating networking and security services.

BACKGROUND OF THE INVENTION

Animal owners frequently consider the health of their pets. In particular, animal owners frequently engage in physical activities with their pets in order to ensure that not only the pets remain active, but also that the pets are mentally stimulated. A common way to accomplish this is to take the pet on walks and/or journeys; however, a major drawback to this is that walking pets, especially within the vicinity of a pet owner's home may create a personal security issue. For example, walking a dog along a customary route creates an increased amount of vulnerability for both the pet owner and the pet due to the possibility of burglary, kidnapping, and other realistic risks.

One approach is to increase the amount and types of information collected by the pet. For example, pet collars and other pet wearable ornaments have begun integrating components such as GPS functionality, bio-sensors, and other features in order to collect real-time data to ascertain the health and whereabouts of the pet. However, these aforementioned systems fail to provide any type of security mechanisms that not only detect dangerous and/or emergency conditions involving the pet and/or pet owner, but also to seek to notify appropriate parties upon detection of said dangerous and/or emergency conditions.

Additionally, pets may serve as a networking facilitator allowing social interactions among individuals who share a common nexus being the ownership of a pet. As a result, things such as dog parks, dog daycares, pet playdates, and applicable pet-friendly environments become ripe with opportunities for establishing friendships, business relationships, dating, and the like. In addition, pets serving as network facilitators provides an opportunity for networks of specific breed owners to interact, share knowledge, and optimize on the care of their particular pet. However, like most sources of networking, the aforementioned environments lend themselves to security issues and other safety issues. For example, in some systems the pet donning the pet wearable is confined to a geofence based on the proximity from the home-base device or the network associated with the pet-owner's residence, yet the connection between the network and the pet wearable provides a vulnerability to the pet owner by exposing information that could render their whereabouts or residence location ascertainable.

Furthermore, there are existing social networking platforms that allow pet owners to interact with each other regarding their pets, and in some instances, promote matching based on the pets. However, these platforms do not provide a security and/or authentication mechanism to confirm the existence of the pet along with the authenticity of the alleged pet owner; thus, putting the pet owners operating on the platforms at risk.

What is needed is a system and pet wearable configured to provide real-time data pertaining to a pet in addition to provide security mechanisms for the pet and the pet owner accordingly.

SUMMARY OF THE INVENTION

The invention provides a system and method for a pet-based networking system with a pet wearable including mechanisms that overcome the hereinafore-mentioned disadvantages of the heretofore-known devices and methods of this general type.

With the foregoing and other objects in view, there is provided, in accordance with the invention, a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect of an embodiment of the present invention may include a wearable pet apparatus comprising: a housing configured to include: at least a sensor; a processor communicatively coupled to a server, wherein the processor is configured to: transmit a plurality of signals wherein at least one the signals includes location data; communicatively connect, in a security mode, with an apparatus within a geofence defined by the server; and transmit to the server a plurality of pet data acquired by the sensor.

In some embodiments, the at least a sensor is one or more of a camera, a temperature sensor, a microphone, a GPS sensor, a heartrate sensor, an infrared sensor, a movement sensor, and a haptic sensor.

In some embodiments, the apparatus includes a lighting mechanism configured to emit one or more light indications from the housing based on a determination by the server when the acquired pet data exceeds a predetermined limit.

Another general aspect of an embodiment of the present invention may include a method including: receiving a first plurality of signals from a first apparatus, wherein at least one signal includes location data; defining a geofence based on the location data; detecting a second plurality of signals from a second apparatus within the geofence; activating a security mode on the first and second apparatuses; and establishing a match-based connection between the first apparatus and the second apparatus.

In some embodiments, the first apparatus and the second apparatus are pet wearable devices including a respective processor and a respective sensor configured to acquire a respective plurality of pet data.

In some embodiments, the determination is made by a remotely disposed server pertaining to a pet-based threshold based on the plurality of pet data obtained from one or the other of said respective sensors from said first and second apparatus; and the server is further configured to generate one or more alerts based on the pet-based threshold being exceeded.

In some embodiments, activating the security mode further includes concealing the location data of the first apparatus from the second apparatus.

Another general aspect of an embodiment of the present invention may include a system for pet-based networking including: a server communicatively coupled to a first and second apparatus, the server configured to: receive a first plurality of signals from a first apparatus, wherein at least one signal includes location data; define a geofence based on the location data; detect a second plurality of signals from a second apparatus; activate a security mode on the first and second apparatuses; and establish a match-based connection between the first apparatus and the second apparatus.

Although the invention is illustrated and described herein as embodied in a system and methods for pet-based networking, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the dog collar. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
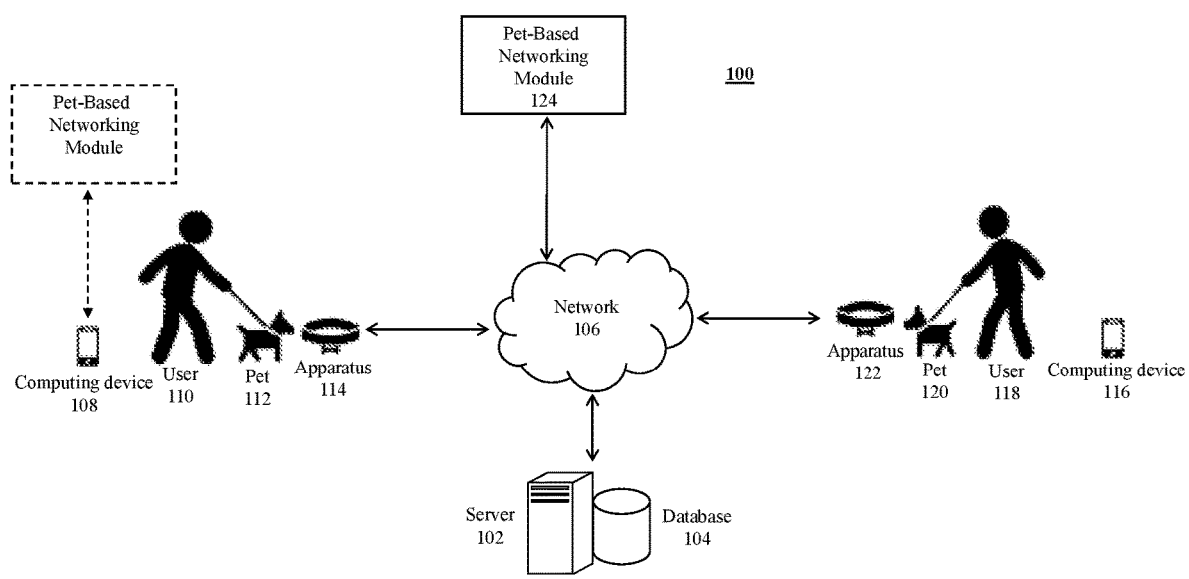
FIG. 1 is a block diagram of a pet-based networking system, according to an exemplary embodiment.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system and method for pet-based networking. Embodiments of the invention provide a dog collar communicatively coupled to a server over a network, and the server is configured to generate a centralized platform. The pet wearable is configured to include a processor and at least a sensor in which the processor is configured to transmit a plurality of pet data acquired by the sensor to a pet-based networking module communicatively coupled to the server. The pet-based networking module is configured to receive the plurality of pet data and utilize the plurality of pet data among various modules in order to generate thresholds, networking connections, detect hazardous conditions, and other various novel features. Embodiments of the invention provide a method configured to facilitate pet-based networking by collecting the plurality of pet data and establishing a geofence for the pet donning the pet wearable based on location data within the plurality of pet data. The pet wearable, which is coupled to a first computing device, transmits a plurality of signals within the geofence in order to discover another pet wearable, coupled to a second computing device, within the geofence. Upon the pet wearable devices discovering each other the server establishes a connection between the computing devices utilizing a novel security mode that protects the privacy of each respective pet owner. Upon the connection being established, the computing devices, utilizing the centralized platform, may communicate with each other while the various modules generate predictions, analyses, and pairings based on the processing of the plurality of pet data collected by both pet wearables. Embodiments of the invention further provide a server configured to utilize machine learning algorithms on training data sourced from the plurality of pet data in order to make predictions and/or analyses, and establish thresholds associated with the respective pet. The systems and methods described herein provide improvements to the health and care of pets along with the safety of both pets and pet owners by establishing secure connections between computing devices that allow pet owners to track and monitor their pets along with facilitate networking in a manner that does not compromise the safety of the pets or pet owners.

Referring to FIG. 1, a system for pet-based networking 100 is depicted, according to an exemplary embodiment. In some embodiments, system 100 includes a server 102 communicatively coupled to a database 104, a communicative network 106, a first computing device 108 used by a first user 110, a first wearable pet apparatus 114 worn by a first pet 112, a second computing device 116 used by a second user 118, and a second wearable pet apparatus 122 worn by a second pet 120. In some embodiments, system 100 further includes a pet-based networking module 124, and server 102 is designed to generate and host a centralized platform that is configured to utilize, view, and contribute/edit data provided to server 102 and/or pet-based networking module 124. It is to be understood that users 110 and 118 are pet owners/caretakers (temporarily or permanently) of pets 112 and 120 respectively; however, system 100 is not limited to pets and as described herein pets 112 and 120 may be children, elderly individuals, or any other applicable body or item that may require guardianship and/or monitoring. In some embodiments, wearable pet apparatuses 114 and 122 are 'internet of things' (IOT) devices configured to exchange data with devices of system 100 over network 106. In some embodiments, network 106 may be implemented as a Local Area Network (LAN), a Wide Area Network (WAN), a mobile communication network (GSM, GPRS, CDMA, MOBITEX, EDGE), the Internet, a peer-to-peer network, one or more terrestrial, satellite or wireless links, or any medium or mechanism that provides for the exchange of data between the aforementioned components of system 100. System 100 illustrates only one of many possible arrangements of components that can be configured to perform the functionality described herein. Other arrangements may include fewer or different components, and the division of work between the components may vary depending on the arrangement. FIG. 1 shows several advantageous features of the present invention, but, as will be described below, the invention can be provided in several shapes, sizes, combinations of features and components, and varying numbers and functions of the components. As described herein, a computing device (e.g. 108, 116) may be a mobile phone, tablet, smart phone, desktop, laptop, wearable technology, or any other applicable device or system including at least a processor. As used herein, the term "owner" and "user" will be used in the following description to indicate a person that is responsible for taking care of an animal, such as the animal's owner, trainer, or other individual.

In a preferred embodiment, wearable pet apparatuses 114 and 122 can be communicatively coupled to server 102, and/or pet-based networking module 124, allowing computing devices 108 and 116 to have access to data collected and/or generated by wearable pet apparatuses 114 and 122 pertaining to pets 112 and 120, respectively, via the centralized platform. In some embodiments, database 104 can store a plurality of pet apparatus profile records, a plurality of pet profile records, and a plurality of pet owner records. The purpose of the plurality of pet apparatus profile records is to have a data record for a corresponding apparatus that can be updated in real-time and that pertains to the status of components/hardware, mechanisms (software included), and features/functions of wearable pet apparatuses 114 and 122 discussed in greater detail in FIG. 2. Pet-based networking module 124 can facilitate a social networking session between users 110 and 118 via computing devices 108 and 116, allowing, for example, chat operation. In addition, pet-based networking module 124 can include a plurality of modules configured to provide functions such as, but not limited to, location/geofencing services, hardware optimization, user-specific matching/recommendation services, and security mechanisms. Components, mechanisms, and functions of pet-based networking module 124 are discussed in greater detail in FIG. 3.

Figure 2:
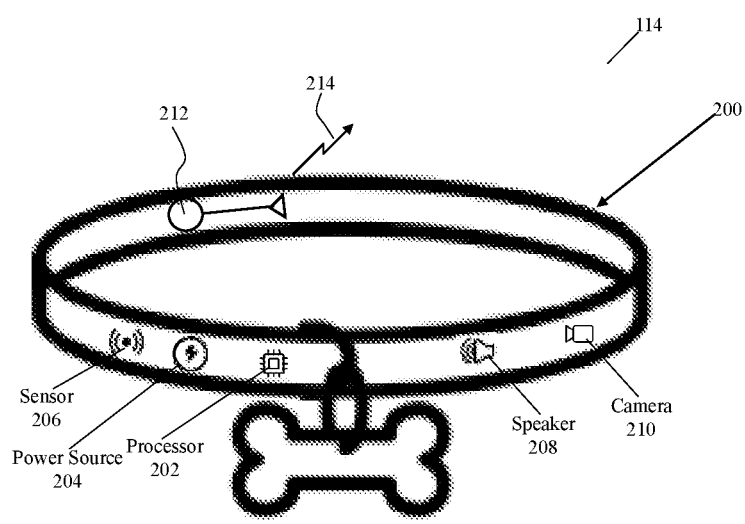
FIG. 2 is a front view of a wearable pet apparatus of the system of FIG. 1, according to an exemplary embodiment.

Referring to FIG. 2, which shows an example of a wearable pet apparatus 114 that can be embodied as a collar 200, as depicted. It is to be understood that wearable pet apparatuses as described herein can be in the form of a collar, harness, pendant/charm, implantable device, anklet, garment, or any other applicable mechanism configured to be donned or implanted on a body. As described herein, a body is the physical structure of a person, animal, or item. In some embodiments, collar 200 includes a processor 202 (which may include a controller such as a network interface controller or any other applicable controller), a power source 204, a sensor 206, a speaker 208, and a camera 210. Collar 200 may include more or fewer components, mechanisms, and functionalities; however, in a preferred embodiment, collar 200 includes at least processor 202, power source 204, and sensor 206, and processor 202 is communicatively coupled to at least one of server 102 and/or pet-based networking module 124 via network 106. In some embodiments, sensor 206 may be one or more of a camera, one or more physiological sensors, one or more environmental sensors, a temperature sensor, a microphone, a GPS receiver, a heartrate sensor, an infrared sensor, an angular acceleration/movement sensor, an orientation (compass) sensor, a haptic sensor, or any other applicable type of sensor known to those of ordinary skill in the art. In some embodiments, sensor 206 may be a plurality of sensors configured to support an internet-of-things (IOT) sensor network supported by network 106, where the plurality of sensors, server 102, computing devices 108 and 116, and pet-based networking module 124 may be "network nodes" that support communication amongst each other. It is to be understood that various forms of routing may be utilized amongst the network nodes including but not limited to multi-hop networking protocols and any other applicable routing protocols known to those of ordinary skill in the art. In some embodiments, collar 200 may include a framework configured to have processor 202, power source 204, sensor 206, speaker 208, and camera 210 integrated throughout. In some embodiments, collar 200 may include an alerting mechanism which may include but is not limited to a vibrating element, a whistle/sound emitter element, a shocking device, a controlled scent/pheromone emission device, or any other applicable mechanism configured to be integrated into a collar known to those of ordinary skill in the art. In some embodiments, the framework may be composed of leather, fabrics (i.e., nylon, hemp, etc.), polyesters, plastic, a combination thereof, or any other applicable type of material or substance used to manufacture collars known to those of ordinary skill in the art. In some embodiments, the framework is padded and composed of one or more recyclable and eco-friendly materials that are configured to prevent irritation to the body donning collar 200. In some embodiments, the framework may have reflective material integrated into it in order for collar 200 to be detectable in poorly lit or dark areas. In some embodiments, collar 200 further includes a lighting mechanism such as one or more light-emitting diodes (LED) or pulsing lights configured to generate light indications such as but not limited to flashing, strobing, beaming, or any other applicable type of light distribution from the framework. In some embodiments, the lighting mechanism is configured to emit one or more indications based on a determination by server 102 that the plurality of pet data exceeds a predetermined limit established by either server 102 or the user. For example, sensor 206 may detect an unknown or foreign object (object that is not the applicable user or applicable communicatively coupled computing device) within a certain proximity of collar 200 in which processor 202 transmits instructions to activate the lighting mechanism. One purpose of this feature is to ensure that pet 112 is visible within poorly lit or dark areas, or to deter approaching and/or undesired contact with pet 112 by strangers. In order to transmit and receive information, the collar 200 can include a transceiver 212 that is configured to transmit and receive radio signals 214 of a particular air interface. For example, transceiver 212 can be a cellular transceiver (e.g. LTE 3G/4G/5G), or a local area network transceiver (e.g. WiFi, WLAN), or a personal area network transceiver (e.g. BlueTooth, Zigbee), each of which operate according to a different air interface.

Figure 3:
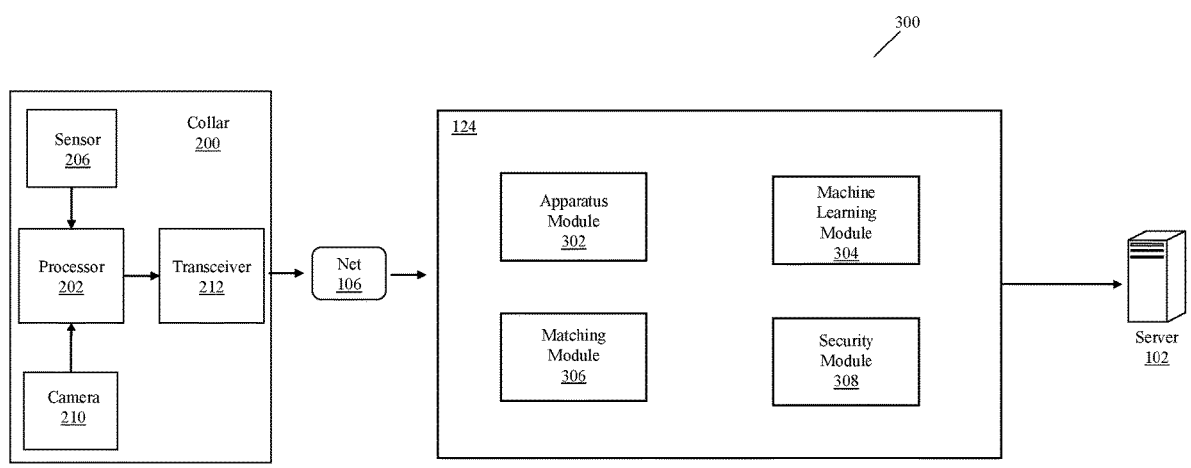
FIG. 3 is a block diagram of a data transmission flow utilizing a pet-based networking module of the system of FIG. 1, according to an exemplary embodiment.

Referring now to FIG. 3, a data transmission flow 300 utilizing pet-based networking module 124 is depicted, according to an exemplary embodiment. In some embodiments, sensor 206 collects a plurality of pet data from pet 112 and the surrounding environment, and processor 202 transmits the plurality of data to pet-based networking module 124 over network 106 via transceiver 212. In some embodiments, pet-based networking module 124 includes an apparatus module 302, a machine learning module 304, a matching module 306, and a security module 308. It is to be understood that additional modules for pet-based networking module 124 are within the scope and spirit of the invention. It is to be understood that one purpose of pet-based networking module 124 is to receive, process, and optimize the plurality of pet data for transmission to server 102 (via network 106). That is, the pet-based networking module 124 can refine data by performing data processing operations on the data (filtering, averaging, etc.), compressing the data, creating metadata, and so on. In some embodiments, one or more subsets of the plurality pet data may be transmitted directly to server 102 by processor 202 over network 106. In some embodiment, apparatus module 302 is configured to monitor and manage the function and efficiency of wearable pet apparatus 114 and its components, in which the applicable data is maintained in database 104 and reflected in the applicable pet apparatus profile record of the plurality of pet apparatus profile records. For example, apparatus module 302 may be configured to provide one or more user interfaces utilized by the centralized platform and presented to computing devices 108 and 116 to display to users 110 and 118 the status of one or more components of wearable pet apparatuses 114 and 122 in which users 110 and 118 may establish or adjust features of the one or more components of collar 200 via the centralized platform. It is to be understood that sensor 206 may be configured to collect the plurality of pet data; however, sensor 206 and/or processor 202 (alone or in combination) may also be configured to collect a plurality of performance/operational data associated with components of collar 200 including but not limited to remaining battery power of power source 204, current volume of speaker 208, settings/modes of camera 210, and any other applicable data, settings, and/or analytics pertaining to wearable pet apparatuses 114 and 122. In some embodiments, a live video stream collected by sensor 206 (microphone) and/or camera 210 is transmitted to pet-based networking module 124 allowing pet-based networking module 124 to optimize the live video stream for transmission over network 106 to server 102 resulting in the centralized platform providing users 110 and 118 access to the live video stream. In some embodiments, the one or more user interfaces allow users 110 and 118 to modify or adjust the settings of the one or more components of wearable pet apparatuses 114 and 122, respectively. For example, the one or more user interfaces may allow users 110 and 118 to adjust the settings, modes, viewing angles, or any other applicable feature of camera 210. This impacts users 110 and 118 ability to view the live stream video in order to assess the surrounding environment of wearable pet apparatuses 114 and 122.

In some embodiments, machine learning module 304 can include a machine learning server communicatively coupled to server 102 that is configured to generate a classification model generated based on training data utilizing one or more machine learning techniques, in which feature values and/or training data (instances of the training data) are configured to be inserted into the classification model. It is to be understood that machine learning as provided is the study and construction of algorithms that can learn from, and make predictions on, data. Such algorithms operate by building a model from inputs in order to make data-driven predictions or decisions. The machine-learned model is trained based on multiple attributes (or factors) described herein. In machine learning parlance, such attributes are referred to as "features". In an embodiment, various feature weights or coefficients are established in order to accurately generate outputs, such as predictions or analyses for one or more components of system 100. It is to be understood that the training data may be derived from one or more of the plurality of pet data, the plurality of performance/operational data, and/or data sourced from server 102, or computing devices 108 and 116. The training data is configured to be dynamically acquired over long periods of time. For example, a new machine-learned model is generated regularly, such as every hour, day, month, week, or other time period. Thus, the new machine-learned model may replace a previous machine-learned model. Newly acquired or changed training data may be used to update the model. In some embodiments, the outputs of machine learning module 304 pertain to one or more analyses pertaining to wearable pet apparatuses 114 and 122 including but not limited to the pets' walking pattern, landmarks/locations frequently stopped at, biological activities of the pet, likelihood of being in the proximity of a particular pet/breed, geolocations of areas to be avoided, or any other applicable data associated with a pet and/or pet owner known to those of ordinary skill in the art. For example, machine learning module 304 may be configured to generate an output reflecting the likelihood of a pet urinating in a specific location based upon a history of location data of pet 112 ascertained from the plurality of pet data. In some embodiments, the output of machine learning module 304 is a scoring or value indicating the likelihood of a current or potential danger associated with pet 112 and/or pet 120.

In some embodiments, machine learning module 304 may further include a computer vision system configured to monitor a plurality of positions in which sensor 206 and/or camera 210 acquires a plurality of images and machine learning module 304 utilizes training data derived from the plurality of images in order to render a 3D model reflecting the environment in which pet 112 donning wearable pet apparatus 114 is within. It is to be understood that one of the purposes of the computer vision system is to provide users of the centralized platform with an accurate depiction of the surroundings of the pet along with a classification of existing and/or potential hazards, obstructions, or distractions within the environment ascertainable from the plurality of images. For example, the computer visioning system may detect and classify a snake within the environment that pet 112 is walking within in which server 102 is configured to generate an alert to user 110 or generate instructions configured to be transmitted to processor 202 in which processor 202 activates speaker 208 to emit a voice command or sound that pet 112 is familiar with. In some embodiments, upon processor 202 receiving instructions, processor 202 may activate one or more of the applicable components of collar 200 configured to grasp the attention of pet 112. For example, upon detection of an apparent or potential hazard within the environment of pet 112, processor 202 may instruct the lighting mechanism to emit or pulse a distraction light or laser to steer pet 112 away from the hazard.

Matching module 306 is configured to utilize one or more algorithms to calculate and present potential matches for user 110 and/or pet 112 on the centralized platform. It is to be understood that the plurality of pet profile records and plurality of pet owner records generated server 102 are associated with the pets and users of system 100, respectively. In some embodiments, server 102 generates one or more user interfaces including the plurality of pet profile records and/or plurality of pet owner records in which the plurality of pet profile records and/or plurality of pet owner records are generated based on the plurality of pet data, data inputs provided by users 110 and 118 on the centralized platform, or data sourced from an applicable third party. As described herein, an applicable third party includes but is not limited to a social media platform (Facebook, LinkedIn, etc.), online user activity macro-analytics and micro-analytics companies, applicable Application Programming Interfaces (APIs), and any other applicable party known to those of ordinary skill in the art. In some embodiments, matching module 306 suggests pet profile records and/or pet owner records based on one or more factors including but not limited to location of pets and/or users of system 100, pet breed, pet walking route pattern, pet/pet owner characteristics (age, personality, likes/dislikes), outputs of machine learning module 304, or any other applicable factors for matching profiles.

In some embodiments, pet-based networking module 124 is designed and configured to communicate with server 102 over network 106 in order to establish a geofence associated with pets 112 and 120 via wearable pet apparatuses 114 and 122. It is to be understood that one of the purposes of the geofence is to serve as a defined virtual perimeter pertaining to pets 112 and 120 in which if the applicable pet travels outside of the geofence, then server 102 transmits one or more alerts to computing devices 108 and 116 via the centralized platform. In addition, the geofence is configured to establish a geographic range in which wearable pet apparatuses 114 and 122 may transmit and exchange one or more signals to establish a connection. In some embodiments, the geofence is established by server 102 and/or pet-based networking module 124 (alone or in combination) defining the geofence by geographic location of the applicable computing device of system 100, defining the geofence by geographic location of the applicable wearable pet apparatus, defining the geofence by real property boundaries, defining the geofence by the radius around a beacon/home-base device, and/or defining the geofence by the perimeter of a building/domicile. In some embodiments, the geofence is configured to be defined by the users via inputs provided on the centralized platform operating on the computing devices. In some embodiments, wearable pet apparatus 114 emits one or more signals in which at least one of the signals includes location data, and the geofence is defined based on the location data. In some embodiments, the geofence may also be defined by contextual information derived from one or more of server 102, first computing device 108, and/or second computing device 116. For example, server 102 may acquire the plurality of pet data from one or more of wearable pet apparatuses 114 and 122 and any additional applicable data from computing devices 108 and 116 in which server 102 may establish a "common connection" between pets 112 and 120 and/or users 110 and 118. As described herein, a common connection may be a similarity between two entities including but not limited to a shared geolocation/proximity, a liked/disliked topic, a breed of pet, or any other applicable data that may create a nexus between two pets or users operating on the centralized platform. In some embodiments, the geofence may extend in geographic range based upon pet or user exposure and/or familiarity with an area or landmark (i.e., whether the pet or user has been in the area before). In some embodiments, server 102 may monitor and adjust the geofence based upon additional data received by at least one of server 102, computing devices 108 and 116, and/or wearable pet apparatuses 114 and 122. In addition, a geofence can be defined as boundary in which the pet is not allowed out of, and upon approaching a border of a geofenced region the collar can emit a warning tone, followed by a mild shock if the pet does not retreat from the border. Over time the pet will become trained to stay within the geofenced region. The geofenced region can include a soft border at which the audible and/or tactile (e.g. vibration) alert can be provided to warn the pet, and then a hard border that is outside of, and surrounds the soft border, which set the border where, if the pet moves to the hard border, will receive a correction via the collar. The machine learning 304 can used to evaluate location data of the pet relative to the various borders of a geofenced region, and adjust the borders, or at least the soft border, based on how well the pet responds to the alert and correction. Over time this will train the pet as to the physical border of the geofenced region.

It is to be understood that security module 308 is designed and configured to provide a mechanism to ensure the safety of pets and users associated with system 100, but also security module 308 prevents spoofing, phishing, and other fraudulent acts. In some embodiments, security module 308 is configured to utilize machine learning module 304 in order to detect and/or predict spam, phishing, spoofing, or any other applicable attacks. Machine learning module 304 may accomplish by utilizing one or more of a deep neural-network, a feed-forward deep neural network, a recurrent neural-network, a convolutional neural-network, a restricted Boltzmann machine, a deep belief network, and/or a deep auto-encoder based on the aforementioned training data sets and applicable data sources. In some embodiments, the one or more outputs of machine learning module 304 are classifications of an attack and/or attempt of an attack. Due to the nature of continuous data collection by computing devices and back-end transmitting of the collected data, security module 308 is designed and configured to prevent server-based processing of sensitive data collected by computing devices 108 and 116 and/or wearable pet apparatuses 114 and 122 by filtering the collected data for sensitive data, and supporting processing of sensitive data collected from the aforementioned devices via centralization of processing the sensitive data via pet-based networking module 124 prior to the optimized data (collected data not included the sensitive data) being transmitted to server 102 over network 106. An additional novel feature of security module 308 is the ability to establish a linking or connection between computing devices 108 and 116 and/or wearable pet apparatuses 114 and 122 while activating and maintaining a security mode configured to monitor the safety of pets 112 and 120. In some embodiments, the linking or connection may be established by networking mechanisms including, but not limited to induction wireless, infrared wireless, ultra wideband, Zigbee, Bluetooth, or any other applicable local area networks (LAN)/personal area networks (PAN) or applicable secured networking protocols known to those of ordinary skill in the art.

In particular, security module 308 communicates with matching module 306 allowing computing devices 108 and 116 to connect with each other upon wearable pet apparatuses 114 and 122 swapping applicable signals. In some embodiments, upon wearable pet apparatuses 114 and 122 swapping signals, security module 308 communicates with computing devices 108 and 116 in order to receive authorization from user 110 and user 118 to establish the link/connection between the two devices. Upon receiving authorization from both users, security module 308 activates the security mode in which the location of computing devices 108 and 116 and wearable pet apparatuses 114 and 122 are encrypted and masked in order to prevent one user from having access to the location/coordinates and/or IP address of another user and/or another user's pet. In addition, security mode includes activation of sensor 206 and/or camera 210 in order to acquire real-time images/photos of the environment the applicable pet is within. This feature provides users of the centralized platform the opportunity to monitor the surroundings of their pet from a distance in addition to trigger alerts or execute instructions to activate applicable features on the wearable pet apparatus including but not limited to the lighting mechanism, the vibrating element, the whistle/sound emitter element, the shocking device, the controlled scent/pheromone emission device, or any other applicable feature of the wearable pet apparatus upon detection of danger. For example, activation of the security mode may occur upon pet 112 coming into contact with second user 118 in which pet-based networking module 124 is able to ascertain that second user 118 is not first user 110 and apparatus module 302 executes instructions to activate sensor 206 and/or camera 210 to acquire useful data configured to circumvent pet 112 from being harmed and/or stolen. In some embodiments, user 110 may provide a whitelist of users on the centralized platform that are allowed to come into contact with wearable pet apparatus 114 without activating the security mode. The purpose of this feature is to assign individuals utilizing computing devices that may be associated with wearable pet apparatus 114 for the purpose of temporarily caring for and/or monitoring pet 112 when first user 110 is not available to. For example, first user 110 may assign an applicable computing device associated with a dog-sitter to wearable pet apparatus 114; however, the dog-sitter may have limited access to the pet profile record associated with pet 112 and wearable pet apparatus 114 in which the dog-sitter is provided one or more subsets of the plurality of pet data necessary in order to render temporary care or aid to pet 112.

In some embodiments it is contemplated that at least some of the matching information can be secured and authenticated using a blockchain network. For example, access to personal information can be stored on a blockchain such that access to it requires authentication that ensures a requester meets certain criteria. Access to a user's information can be controlled by a smart contract that requires a requesting entity be physically located in a shared geofenced region with a pet, which can be verified as a transaction condition. Information shared between people who are connected by the matching module 306 can be controlled by blockchain access rules. Thus, a person receiving an image of another user, for example, can be prevented from loading a copy of the image into non-volatile storage and then sharing the image. The application program on the mobile device can inhibit screen shots while displaying the image and ensure that the image and other user information is only held in volatile storage that can then be deleted, such as if the device leaves the geofenced area.

Additionally, the security module 308 can be configured to keep the pet safe. For example, pet theft has become an issue, and has even affected public figures (e.g. celebrities) who have had pets stolen. Security module 308 can detect when a pet has left a geofenced area and alert the owner/caretaker by sending an alert message to their mobile device. In addition, the security module 308 can work with the machine learning module 304 to evaluate the pet's movement, as indicated by location data to determine whether the pet's movement is indicative of typical pet movement (e.g. stopping frequently to sniff) or whether the pet's movement is more indicative of being stolen (e.g. based on straight line, higher than typical speed movement). Upon determining that the pet is being stolen, the security module can operate to enable sensors on the peat wearable apparatus, such as the camera and microphone, if available, and receive video/audio signals from the pet wearable apparatus and provide that information in a link to the owner's/caretaker's mobile device, along with location information that may assist in recovering the pet.

Figure 4:
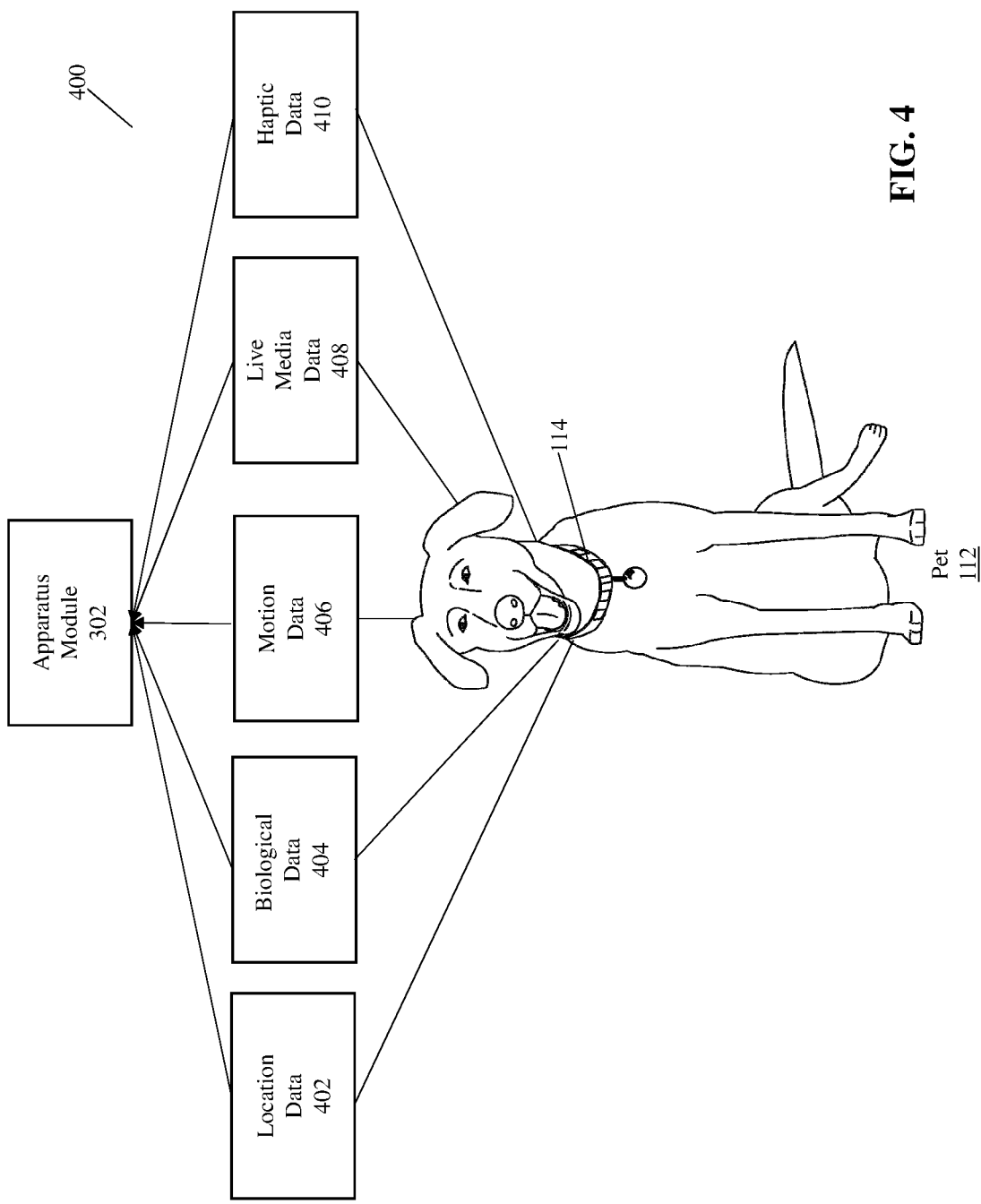
FIG. 4 is a block diagram of data collection flow of the system of FIG. 1, according to an exemplary embodiment.

Referring now to FIG. 4, a data collection flow 400 sourced from pet 112 donning wearable pet apparatus 114 is depicted, according to an exemplary embodiment. It is to be understood that data collected from wearable pet apparatus 114 via sensor 206 and/or any other applicable components of wearable pet apparatus 114 is the plurality of pet data specific to pet 112. However, in some embodiments, the plurality of pet data may also include data collected by computing device 108. The purpose of including data collected by computing device 108 in the plurality of pet data is to allow first user 110 to provide data that may not only supplement the plurality of pet data, but also provide useful data to machine learning module 304 to increase the accuracy of outputs generated by machine learning module 304. For example, first user 110 may provide data specific to pet 112 including but not limited to the nutrients consumed by pet 112, the preferences of pet 112, the routine of pet 112, or any other applicable information pertaining to user 110 and/or pet 112 which is not ascertainable from the plurality of pet data. In some embodiments, pet-based networking module 124 is configured to filter and classify the plurality of pet data based on its content. For example, pet-based networking module 124 is designed and configured to receive the plurality of pet data and classify a plurality of data subsets of the pet data in which the plurality of subsets may include at least location data 402. In some embodiments, the plurality of subsets may further include a biological data subset 404, a motion data subset 406, a live media data subset 408, and a haptic data subset 410. It is to be understood that the plurality of data subsets may include any other applicable classification of data subset and/or type of data known to those of ordinary skill in the art including but not limited to geographic/geospatial data, heartrate data, respiration rate data, total water intake data/hydration data, inertial measurement data, image/video data, haptic data, or any other applicable type of data. In some embodiments, the plurality of pet data is collected and stored incrementally at a cloud-based server associated with pet-based networking module 124 allowing power source 204 to sustain a longer battery life.

Figure 5:
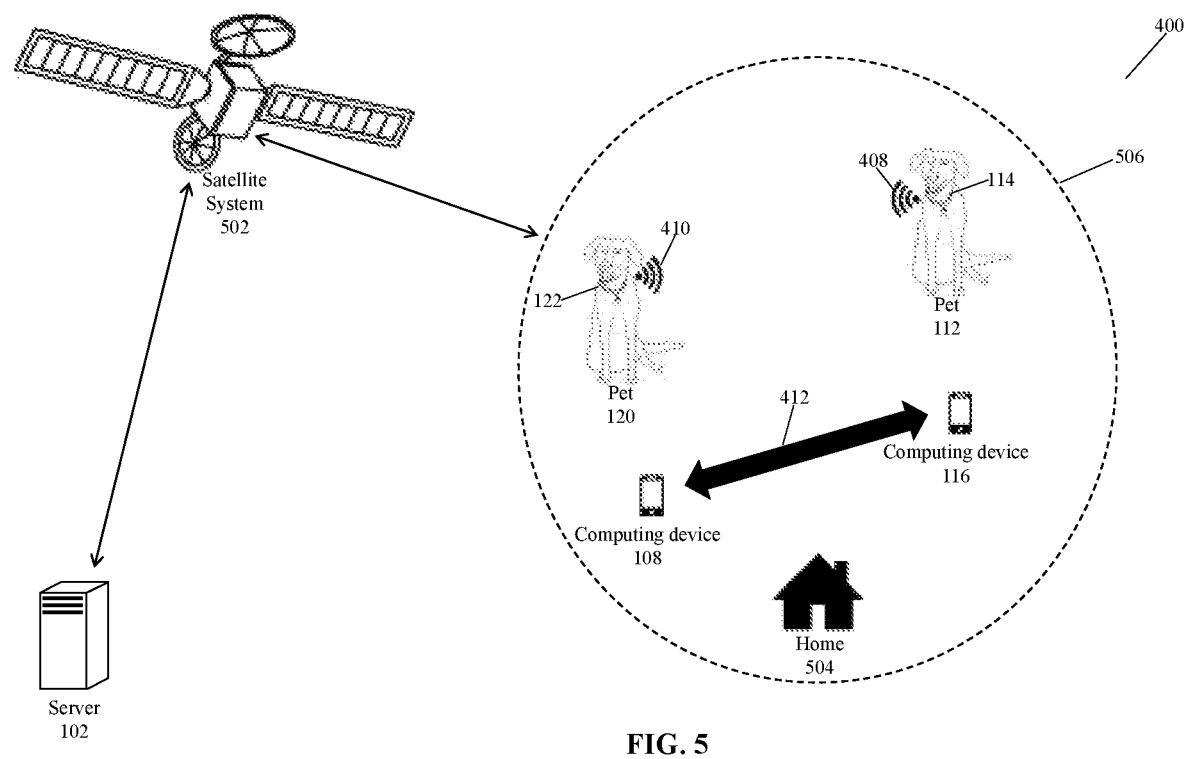
FIG. 5 is a geofencing system of the system of FIG. 1, according to an exemplary embodiment.

Referring now to FIG. 5, a geofencing system 500 of system 100 is depicted, according to an exemplary embodiment. In some embodiments, geofencing system 500 includes GPS satellite system 502 configured to communicate with server 102 and communicatively coupled to processor 202, a home-based entity 504 configured to be associated with at least one of first user 110 or pet 112, and a geofence boundary 506 associated with at least one of wearable pet apparatuses 114 or 122. In some embodiments, home-based entity 504 is a representation of a beacon/home-base device reflecting where user 110 and/or pet 112 resides. In some embodiments, geofence boundary indicator 506 is established based upon a predetermined proximity from the beacon/home-base device; however, the predetermined proximity may be measured from first computing device 108. The purpose of the predetermined proximity is to ensure that pet 112 does not venture beyond a certain distance from either home-based entity 504 or first user 110. In some embodiments, geofencing system 500 may further include a geofence boundary indicator which may be achieved by one or more executable instructions generated by server 102 and transmitted to processor 202 to activate one or more of the vibrating element, the lighting mechanism, the whistle/sound emitter element, the shocking device, the controlled scent/pheromone emission device, or any other applicable mechanism of collar 200. Upon the predetermined proximity being reached and/or exceeded, the geofence boundary indicator is emitted at collar 200 to alert pet 112 that it has ventured outside of geofence boundary 506. In some embodiments, the geofence boundary indicator will continuously emit until the server 102 detects wearable pet apparatus 114 within geofence boundary 506. In some embodiments, if wearable pet apparatus 114 is detected outside of geofence boundary 506 then server 102 is configured to transmit one or more correspondences to an applicable third party including but not limited to emergency responders, first user 112, users included on the whitelist, animal response coalition, or any other applicable party configured to rescue/assist an animal in need.

It is to be understood that satellite system 502 is configured to continuously be in contact with server 102 in order for first user 108 to be able to continuously track and monitor the positioning/whereabouts of pet 112 via wearable pet apparatus 114 in real-time. In a preferred embodiment, computing devices 108 and 116, wearable pet apparatuses 114 and 122, and home-based entity 504 are within geofence boundary 506 allowing wearable pet apparatus 114 to emit a first plurality of signals 508 and wearable pet apparatus 122 to emit a second plurality of signals 510. Upon swapping of pluralities of signals 508 and 510, server 102 with assistance of GPS satellite system 502 establishes that wearable pet apparatuses 114 and 122 are within geofence boundary 506 and matching module 306 provides server 102 with the visual profile for approval of the receiving user in which the profile reflects the applicable information included in a profile record. For example, upon server 102 establishing that wearable pet apparatuses 114 and 122 are within geofence boundary 506, server 102 transmits the visual profile associated with second user 118 or pet 120 to computing device 108 via the centralized platform. Upon first user 110 and second user 118 indicating approval of each other via inputs on their respective computing devices, server 102 and/or pet-based networking module 124 establishes a secured connection 512 between computing devices 108 and 116 via security module 308. In some embodiments, while within secured connection 512, security module 308 is configured to provide a private communications portal designed to facilitate one or more communications between users 110 and 118 in a manner in which the geographic locations of users 110 and 118, pets 112 and 120, and home-based entity 504 are unascertainable. This feature allows users of the centralized platform interact with each other upon consented approval without rendering themselves vulnerable to accessibility by strangers. In some embodiments, geofence boundary 506 is dynamic and useful to restrict movement of pet 112 to a moving object, namely first computing device 108 as opposed to a stationary/fixed environment such as home-based entity 504.

Figure 6:
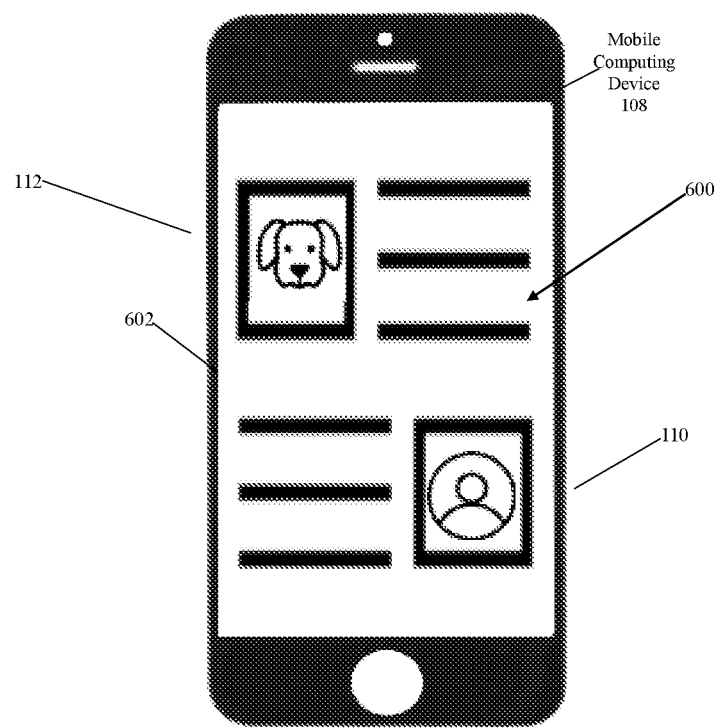
FIG. 6 is a pet-based network profile depicted on a computing device of the system of FIG. 1, according to an exemplary embodiment.

Referring now to FIG. 6, an exemplary user interface 600 including a pet-based network profile 602 presented on first computing device 108 is depicted, according to an exemplary embodiment. For the purpose of the example, pet-based network profile 602 is associated with second user 118 and/or pet 120 and presented to first computing device 108 based on wearable pet apparatus 114 receiving second plurality of signals 510. In some embodiments, data derived from the pet profile record and data derived from the pet owner record are presented on computing device 108 together as illustrated in FIG. 6; however, in some embodiments, pet-based network profile 602 is a visual display of solely second user 118 or pet 120 and their respective information derived from the respective profile record. In some embodiments, user interface 600 is configured to receive a disapproval gesture or an approval gesture/input from first user 110 at first computing device 108. Simultaneously matching module 306 and/or server 102 presents the pet-based network profile associated with first user 110 and/or pet 112 to second computing device 116 for approval or disapproval of second user 118. It is to be understood that presentation of one user's profile to the other is initially based upon wearable pet apparatuses 114 and 122 being within an area encircled by geofence boundary 506; however, in some embodiments, server 102 selects the applicable pet-based network profile for presentation based on server 102 detecting the applicable wearable pet apparatus within geofence boundary 506 in addition to characteristics, pet breeds, likes, or dislikes shared between the users and/or pets. For example, if pet 112 is a Pomeranian that enjoys long walks and pet 120 is a Pomeranian that enjoys long walks as well, then upon wearable pet apparatuses 114 and 122 being within the same geofence boundary their respective pet-based network profiles are presented to the respective computing devices. In some embodiments, matching module 306 may provide users of the centralized platform with a guessing game user interface configured to provide users with pet-based network profiles associated with pets donning wearable pet apparatuses and prompts users to guess the user that the presented pet belongs to.

Figure 7:
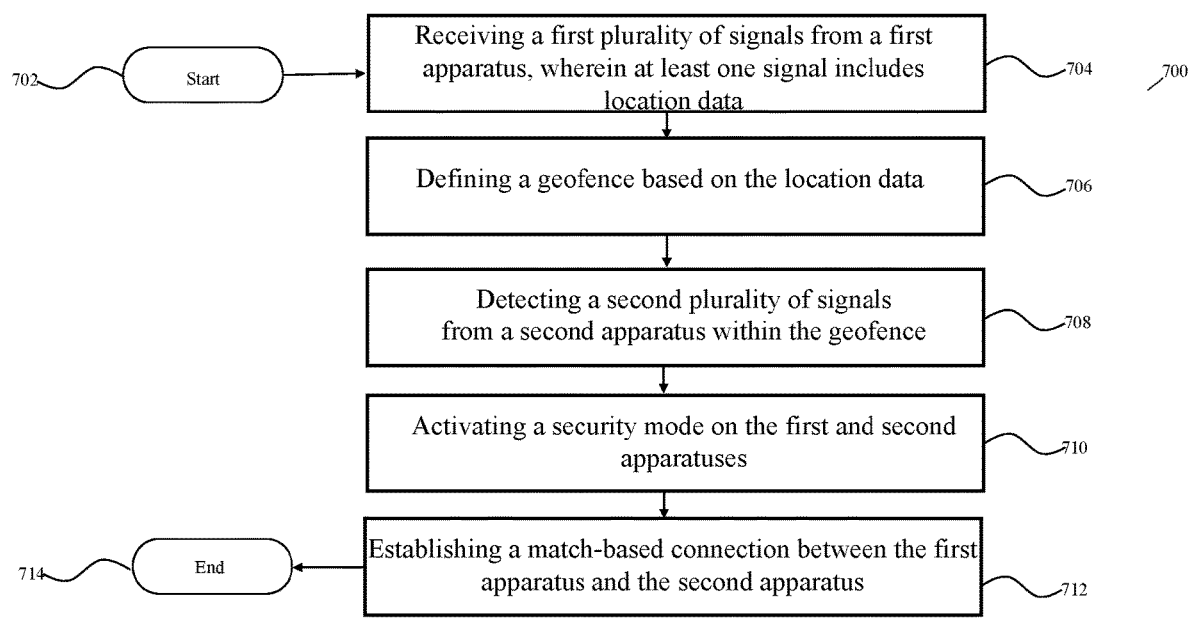
FIG. 7 is a block diagram depicting a method for pet-based networking, according to an exemplary embodiment.

Referring now to FIG. 7, a method 700 for pet-based networking 700 is depicted, according to an example embodiment. At the start 702 the pet wearable apparatus or collar device is powered on and properly provisioned, and being worn by the pet. In step 704 the collar can provide various data to the pet based networking module, including location data. In step 706 a geofence can be selected or defined based on the pet's location. Geofences can be defined in public spaces, parks, and other lands, as well as the owner's residence. Since the pet can be trained as to when it is approaching a border of a geofenced region, properly trained pets can be trusted to stay within defined geofence regions. Accordingly, areas can be defined in parks, for example, where pets are allowed, and where they are not allowed. The geofence operation can be initiated and subsequently deactivated by use of the user/owner's mobile device upon being communicatively linked to the collar. In step 708 the server can detect or otherwise receive signals including data from the second pet wearable apparatus within the geofenced region, indicating its location, as well as other sensor information. In step 710 the security mode can be activated on the first and second pet apparatuses. In the security mode, upon receiving authorization from both users, the security module (e.g. 308) activates the security mode in which the location of computing devices and wearable pet apparatuses are encrypted and masked in order to prevent one user from having access to the location/coordinates and/or IP address of another user and/or another user's pet. In addition, security mode includes activation of the sensor(s) and/or camera in order to acquire real-time images/photos of the environment the applicable pet is within. The security mode provides users the ability to monitor the surroundings of their pet from a distance and to trigger alerts or execute instructions to activate applicable features on the wearable pet apparatus including but not limited to the lighting mechanism, the vibrating element, the whistle/sound emitter element, the shocking device, the controlled scent/pheromone emission device, or any other applicable feature of the wearable pet apparatus upon detection of danger. In step 712 the server can determine that the owners/caretakers of different pets in the geofenced area are suitable matches and commence establishing a match-based connection between the first and second pet wearable apparatuses, which each communicate to their respectively connected mobile devices to indicate the match. Thereafter the people can meet. In step 714 the method ends.

Figure 8:
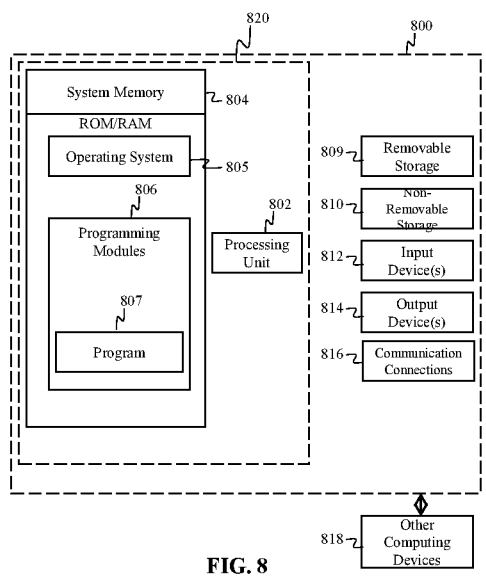
FIG. 8 illustrates a computer system according to exemplary embodiments of the present technology.

FIG. 8 is a block diagram of a system including an example computing device 800 and other computing devices. Consistent with the embodiments described herein, the aforementioned actions performed by pet-wearable devices 112, 122, and server 102 may be implemented in a computing device, such as the computing device 800 of FIG. 8. Any suitable combination of hardware, software, or firmware may be used to implement the computing device 800. The aforementioned system, device, and processors are examples and other systems, devices, and processors may comprise the aforementioned computing device. Furthermore, computing device 800 may comprise an operating environment for system 100 and process/method 700. Process 700, and data related to said processes may operate in other environments and are not limited to computing device 800.

With reference to FIG. 8, a system consistent with an embodiment of the invention may include a plurality of computing devices, such as computing device 800. In a basic configuration, computing device 800 may include at least one processing unit 802 and a system memory 804. Depending on the configuration and type of computing device, system memory 804 may comprise, but is not limited to, volatile (e.g. random access memory (RAM)), non-volatile (e.g. read-only memory (ROM)), flash memory, or any combination or memory. System memory 804 may include operating system 805, and one or more programming modules 806. Operating system 805, for example, may be suitable for controlling computing device 800's operation. In one embodiment, programming modules 806 may include, for example, a program module 807 for executing the actions of server 102 and devices 108 and 112, for example. Furthermore, embodiments of the invention may be practiced in conjunction with a graphics library, other operating systems, or any other application program and is not limited to any particular application or system. This basic configuration is illustrated in FIG. 8 by those components within a dashed line 820.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and nonvolatile, removable and non-removable media implemented in any method or technology for storage of information, such as computer readable instructions, data structures, program modules, or other data. System memory 804, removable storage 809, and non-removable storage 810 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a camera, a touch input device, etc. Output device(s) 814 such as a display, speakers, a printer, etc. may also be included. The aforementioned devices are only examples, and other devices may be added or substituted.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 804, including operating system 805. While executing on processing unit 802, programming modules 806 (e.g. program module 807) may perform processes including, for example, one or more of the stages of the process 700 as described above. The aforementioned processes are examples, and processing unit 802 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

The foregoing disclosure solves the problem security while allowing pet-worn devices to facilitate social engagements by defining geofenced regions, and operating an intelligent matching process to ensure each participant's safety.

What is claimed is:

1. A system including a pet wearable apparatus in communication with a server, comprising:
   the pet wearable apparatus having a housing configured to include:
   at least one sensor,
   a processor communicatively coupled to a remotely disposed the server, wherein the processor is configured to:
   transmit a plurality of signals wherein at least one the signals includes location data;
   communicatively connect, in a security mode, with another pet-wearable apparatus within a geofence defined by the server;
   transmit to the server a plurality of pet data acquired by the sensor;
   the server including training data that comprises a plurality of training instances, each of which includes a plurality of feature values derived from the plurality of signals;
   the server configured to utilize one or more machine learning techniques to train a machine learned model based on the training data; and
   wherein the machine learned model is configured to generate an output associated with the pet wearable apparatus.

2. The system of claim 1, wherein the at least a sensor is one or more of a camera, a temperature sensor, a microphone, a GPS sensor, a heartrate sensor, an infrared sensor, a movement sensor, and a haptic sensor.

3. The system of claim 1, further comprising a lighting mechanism configured to emit one or more light indications from the housing based on a determination by the server when the acquired pet data exceeds a predetermined limit.

4. A method, comprising:
   receiving a first plurality of signals from a first apparatus, wherein at least one signal includes location data;
   defining a geofence based on the location data;
   detecting a second plurality of signals from a second apparatus within the geofence;
   wherein at least one of the first apparatus or the second apparatus include a sensor configured to acquire a plurality of pet data;
   activating a security mode on the first and second apparatuses;
   establishing a match-based connection between the first apparatus and the second apparatus;
   storing training data that comprises a plurality of training instances, each of which includes a plurality of feature values derived from the respective plurality of pet data;
   utilizing one or more machine learning techniques to train a machine learned model based on the training data; and
   wherein the machine learned model is configured to generate an output associated with at least one of the first apparatus and the second apparatus.

5. The method of claim 4, wherein the first apparatus and the second apparatus are pet wearable devices including a respective processor.

6. The method of claim 1, determining, via a remotely disposed server, a pet-based threshold based on the plurality of pet data obtained from one or the other of said respective sensors from said first and second apparatus; and generating, via the server, one or more alerts based on the pet-based threshold being exceeded.

7. The method of claim 4, wherein activating the security mode further comprises concealing the location data of the first apparatus from the second apparatus.

8. The method of claim 1, wherein activating the security mode further comprises: filtering the respective plurality of pet data; detecting one or more indicators of danger; and generating one or more alerts configured to be received by a third party.

9. A system for pet-based networking comprising:
a server communicatively coupled to a first and second apparatus, the server configured to:
receive a first plurality of signals from a first apparatus, wherein at least one signal includes location data;
define a geofence based on the location data;
detect a second plurality of signals from a second apparatus;
activate a security mode on the first and second apparatuses;
establish a match-based connection between the first apparatus and the second apparatus;
store training data that comprises a plurality of training instances, each of which includes a plurality of feature values derived from a plurality of pet data associated with at least one of the first apparatus and the second apparatus;
utilize one or more machine learning techniques to train a machine learned model based on the training data; and
wherein the machine learned model is configured to generate an output associated with at least one of the first apparatus and the second apparatus.

10. The system of claim 9, wherein the first apparatus and the second apparatus are pet wearable devices including a respective processor.

11. The system of claim 9, wherein at least one of the first apparatus and the second apparatus include a respective sensor configured to acquire a plurality of pet data and the server is configured to make one or more determinations based on the plurality of pet data.

12. The system of claim 9, wherein the security mode is configured to hide the location of the first apparatus from the second apparatus.

13. The system of claim 11, wherein the respective sensor is one or more of a camera, a temperature sensor, a microphone, a GPS sensor, a heartrate sensor, an infrared sensor, a movement sensor, and a haptic sensor.

14. The system of claim 11, wherein in the security mode the server is configured to detect one or more indicators of danger based on the plurality of pet data and alert a third party.

15. The system of claim 9, wherein the first apparatus and the second apparatus are configured to transmit a respective plurality of pet data to the server, and the server is configured to generate one or more alerts based on the respective plurality of pet data exceeding a respective pet-based threshold.

16. The system of claim 9, wherein the match-based connection is based on one or more computing devices associated with the first and second apparatuses communicatively coupled to the server over a network.

* * * * *